United States Patent
Matari et al.

(10) Patent No.: US 12,273,281 B2
(45) Date of Patent: Apr. 8, 2025

(54) STATISTICAL HIGH BANDWIDTH AND PACKET RATE CROSSBAR WITH LOW CELL COUNT

(71) Applicant: MELLANOX TECHNOLOGIES, LTD., Yokneam (IL)

(72) Inventors: Idan Matari, Lod (IL); Matisyahu Meier Goldmeier, Kiryat Gat (IL); George Elias, Tel-Aviv (IL); Ofir Klara Altshul, Herzliya (IL); Itamar Rabenstein, Petach-Tiqwa (IL); Noam Michaelis, Kfar-Saba (IL); Eyal Srebro, Kfar Yehoshua (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 18/203,227

(22) Filed: May 30, 2023

(65) Prior Publication Data

US 2024/0406122 A1    Dec. 5, 2024

(51) Int. Cl.
| | |
|---|---|
| *H04L 49/101* | (2022.01) |
| *H04L 49/00* | (2022.01) |
| *H04L 49/111* | (2022.01) |
| *H04L 49/253* | (2022.01) |

(52) U.S. Cl.
CPC .......... *H04L 49/101* (2013.01); *H04L 49/254* (2013.01); *H04L 49/3009* (2013.01); *H04L 49/111* (2022.05)

(58) Field of Classification Search
CPC .. H04L 49/101; H04L 49/254; H04L 49/3009
See application file for complete search history.

(56) References Cited

U.S. PATENT DOCUMENTS

| | | | |
|---|---|---|---|
| 11,070,474 B1 * | 7/2021 | Jain | H04L 49/1515 |
| 11,159,455 B1 * | 10/2021 | Matthews | H04L 47/22 |
| 2019/0007332 A1 * | 1/2019 | Fleming | H04L 47/62 |

* cited by examiner

*Primary Examiner* — Tonia L Dollinger
*Assistant Examiner* — Joseph M Cousins
(74) *Attorney, Agent, or Firm* — Sheridan Ross P.C.

(57) ABSTRACT

An apparatus includes a crossbar circuit that routes one or more packets between one or more ingress domains and one or more egress domains. The crossbar circuit includes sub-crossbar domains. An ingress control circuit associated with the one or more ingress domains may distribute packet data of the one or more packets to the sub-crossbar domains. An egress control circuit of the apparatus receives data bits associated with the packet data from egresses associated with the plurality of sub-crossbar domains. The egress control circuit may reorder or refrain from reordering the data bits based on an attribute associated with the distribution of the packet data.

20 Claims, 4 Drawing Sheets

STATISTICAL HIGH BANDWIDTH AND PACKET RATE CROSSBAR WITH LOW CELL COUNT

FIELD OF TECHNOLOGY

The present disclosure relates to crossbar switches, and more particularly, to techniques for achieving high bandwidth capacity switching while mitigating increases in crossbar cell count.

BACKGROUND

A crossbar switch may implement permutations of connections among ingress lines and egress lines. Techniques for achieving increases in data speed of a crossbar switch while mitigating increases in crossbar cell count in the crossbar switch are desired.

SUMMARY

Examples may include one of the following features, or any appropriate combination thereof.

An apparatus including: a crossbar circuit that routes one or more packets between one or more ingress domains and one or more egress domains associated with the apparatus, wherein the crossbar circuit includes a plurality of sub-crossbar domains; one or more ingress control circuits associated with the one or more ingress domains, wherein the one or more ingress control circuits are to distribute packet data of the one or more packets to the plurality of sub-crossbar domains; and an egress control circuit associated with an egress domain of the one or more egress domains, wherein the egress control circuit is to receive data bits associated with the packet data from egresses associated with the plurality of sub-crossbar domains.

In some aspects, the one or more ingress control circuits are to spread the packet data of the one or more packets among the plurality of sub-crossbar domains based on at least one criterion.

In some aspects, the one or more ingress control circuits are to spread the packet data of the one or more packets among the plurality of sub-crossbar domains based on: a random spreading of the packet data among the plurality of sub-crossbar domains; a pseudo-random spreading of the packet data among the plurality of sub-crossbar domains; a flow hash based spreading of the packet data among the plurality of sub-crossbar domains; a bandwidth spreading of the packet data among the plurality of sub-crossbar domains; a cyclic based spreading of the packet data among the plurality of sub-crossbar domains; buffer occupancy associated with the plurality of sub-crossbar domains; or a combination thereof.

In some aspects, the packet data of the one or more packets is spread among buffers associated with at least one sub-crossbar domain of the plurality of sub-crossbar domains based on: one or more control signals from an ingress control circuit of the one or more ingress control circuits; or one or more second control signals from processing circuitry of the crossbar circuit.

In some aspects, the one or more ingress control circuits are to: set respective buffer thresholds associated with a plurality of buffers allocated to the plurality of sub-crossbar domains; and distribute the packet data among the plurality of buffers based on satisfying at least one buffer threshold of the respective buffer thresholds.

In some aspects, the egress control circuit is to: reorder the data bits received from the egresses of the plurality of sub-crossbar domains based on an ordering; or refrain from reordering the data bits, wherein the egress control circuit reorders the data bits or refrains from reordering the data bits based on an attribute associated with the distribution of the packet data of the one or more packets.

In some aspects, the apparatus further includes: one or more queueing circuits including a dispatcher circuit, wherein the dispatcher circuit is to spread a set of transmission jobs among the plurality of sub-crossbar domains, and wherein the set of transmission jobs are associated with routing the packet data of the one or more packets between a buffer domain of each sub-crossbar domain and the one or more egress domains.

In some aspects, the dispatcher circuit is to: spread the set of transmission jobs among the plurality of sub-crossbar domains based on a target order indicated by the one or more queueing circuits; and allocate buffer space in an egress reorder buffer associated with the egress domain.

In some aspects, the one or more ingress control circuits are to provide one or more control signals associated with: distributing first packet data of the one or more packets to a first sub-crossbar domain of the plurality of sub-crossbar domains; and distributing second packet data of the one or more packets to a second sub-crossbar domain of the plurality of sub-crossbar domains.

In some aspects, the crossbar circuit is to: route first packet data of the one or more packets, via a first sub-crossbar domain of the plurality of sub-crossbar domains, to a multiplexer device associated with an egress domain of the one or more egress domains; and route second packet data of the one or more packets, via a second sub-crossbar domain of the plurality of sub-crossbar domains, to the multiplexer device.

In some aspects, the crossbar circuit includes: a multiplexer device to, based on one or more control signals from an ingress control circuit of the one or more ingress control circuits, provide packet data of the one or more packets to a sub-crossbar domain of the plurality of sub-crossbar domains; and a second multiplexer device to distribute the packet data among buffers of the sub-crossbar domain.

An apparatus including: a crossbar circuit that routes one or more packets between one or more ingress domains and one or more egress domains associated with the apparatus, wherein the crossbar circuit includes a plurality of sub-crossbar domains; and processing circuitry to: distribute, by one or more ingress control circuits associated with the one or more ingress domains, packet data of the one or more packets to the plurality of sub-crossbar domains; and receive, by an egress control circuit associated with an egress domain of the one or more egress domains, data bits associated with the packet data from egresses associated with the plurality of sub-crossbar domains.

In some aspects, the processing circuitry is to further: spread, by the one or more ingress control circuits, the packet data of the one or more packets among the plurality of sub-crossbar domains based on at least one criterion.

In some aspects, the processing circuitry is to further: spread, by the one or more ingress control circuits, the packet data of the one or more packets among the plurality of sub-crossbar domains based on: a random spreading of the packet data among the plurality of sub-crossbar domains; a pseudo-random spreading of the packet data among the plurality of sub-crossbar domains; a flow hash based spreading of the packet data among the plurality of sub-crossbar domains; a bandwidth spreading of the packet data among the plurality of sub-crossbar domains; a cyclic based spreading of the packet data among the plurality of sub crossbar domains; buffer occupancy associated with each sub-crossbar domain of the plurality of sub-crossbar domains; or a combination thereof.

In some aspects, the packet data of the one or more packets is spread among buffers associated with at least one sub-crossbar domain of the plurality of sub-crossbar domains based on: one or more control signals from an ingress control circuit of the one or more ingress control circuits; or one or more second control signals from processing circuitry of the crossbar circuit.

In some aspects, the processing circuitry is to further: set, by the one or more ingress control circuits, respective buffer thresholds associated with a plurality of buffers allocated to the plurality of sub-crossbar domains; and distribute, by the one or more ingress control circuits, the packet data among the plurality of buffers based on satisfying at least one buffer threshold of the respective buffer thresholds.

In some aspects, the processing circuitry is to further: reorder the data bits received from the egresses of the plurality of sub-crossbar domains based on an ordering; or refrain from reordering the data bits, wherein the processing circuitry reorders the data bits or refrains from reordering the data bits based on an attribute associated with the distribution of the packet data of the one or more packets.

A switching device including: a crossbar circuit including a plurality of sub-crossbar domains; and one or more ingress control circuits that are to distribute packet data of one or more packets to the plurality of sub-crossbar domains; and an egress control circuit that is to receive data bits associated with the packet data from egresses associated with the plurality of sub-crossbar domains.

In some aspects, the one or more ingress control circuits are to spread the packet data of the one or more packets among the plurality of sub-crossbar domains based on at least one criterion.

In some aspects, the packet data of the one or more packets is spread among buffers associated with at least one sub-crossbar domain of the plurality of sub-crossbar domains based on: one or more control signals from an ingress control circuit of the one or more ingress control circuits; or one or more second control signals from processing circuitry of the crossbar circuit.

DETAILED DESCRIPTION

The ensuing description provides example aspects of the present disclosure, and is not intended to limit the scope, applicability, or configuration of the claims. Rather, the ensuing description will provide those skilled in the art with an enabling description for implementing the described examples. It being understood that various changes may be made in the function and arrangement of elements without departing from the spirit and scope of the appended claims. Various aspects of the present disclosure will be described herein with reference to drawings that are schematic illustrations of idealized configurations.

Crossbar switches are designed to implement permutations of connections among ingress lines and egress lines. Some techniques for achieving an increase in data speed (e.g., packets per second (PPS)) of a crossbar switch by a factor of X increase the crossbar cell count in the crossbar switch by a factor of $X^2$. Techniques for high bandwidth capacity switching are desired which achieve a high message rate while mitigating increases in size (e.g., crossbar cell count) of the crossbar switch.

The terms "crossbar switch," "crossbar," and "crossbar circuit" may be used interchangeably herein. The terms "crossbar cell," "sub-crossbar cell," "sub-crossbar," and "sub-crossbar circuit" may be used interchangeably herein and may be used to reference a portion of a crossbar switch, crossbar, or crossbar circuit.

According to example aspects of the present disclosure, techniques described herein include, for data received at an ingress of a packet switch, spreading the data over buffers allocated to different sub-crossbar domains (also referred to herein as sub-domains) of the packet switch. In some examples, the packet switch may include a crossbar switch, and each sub-crossbar domain of the packet switch may include a sub-crossbar of the crossbar switch. In some aspects, the techniques may include balancing the data over buffers allocated to the sub-crossbar domains to minimize or prevent the need to multiply the buffer size associated with the crossbar switch by the number of sub-crossbars.

After balancing and spreading the data over the buffers, the data is routed from the sub-crossbars to an egress domain of the packet switch. In some cases (e.g., based on an attribute associated with the distribution of the data among the sub-crossbar domains and buffers), the resulting data as output by the sub-crossbars may be in an order different from the order in which the data was initially received at the ingress of the crossbar switch. The techniques described herein may include reordering the resulting data at the egress domain prior to outputting a resultant packet at an egress port.

Example aspects of the present disclosure support implementing techniques of spreading and balancing data over buffers allocated over multiple sub-crossbar domains, and reordering the data prior to egress. The techniques may be implemented in an on-die chip. In some aspects, the techniques described herein for spreading the data may provide randomness (or pseudo-randomness) and balance between the buffers, which may provide technical improvements and advantages (e.g., reduced buffer size and corresponding reduced costs) compared to some other crossbar switch implementations which double the buffer size. In some other aspects, the techniques described herein may monitor respective buffer usage of the buffers (e.g., hold the buffer balance) and distribute data among the buffers based on the buffer usage, which may provide technical improvements and advantages over adaptive routing techniques that fail to consider buffer usage (e.g., adaptive routing techniques that do not hold the buffer balance).

Accordingly, for example, aspects of the present disclosure describe a packet switch including control circuitry (e.g., an ingress control circuit, control circuitry of a crossbar circuit, etc.) that may spread incoming data (e.g., distribute packet data) among the different buffers and sub-crossbar domains according to respective bandwidth capabilities for the buffers and sub-crossbar domains. In an example, the control circuitry may randomly or pseudo-randomly select buffers allocated to one or more sub-crossbars. The control circuitry may spread the incoming data among the randomly (or pseudo-randomly) selected buffers while balancing the amount of data respectively distributed among the buffers, and the sub-crossbars may route the data from the buffers to one or more egress domains of the packet switch. In some aspects, the ingress control circuit or control circuitry of the crossbar circuit may generate control signals for spreading the incoming data among the different buffers and sub-crossbar domains. An egress controller associated with an egress domain of the packet switch may assemble and reorder the data bits output by the sub crossbars according to the order of the data bits as received at the ingress of the packet switch (e.g., at the ingress control circuit).

The techniques described herein may provide improved message rate without changing existing infrastructures (e.g., without increasing overall buffer size) of some packet switch and crossbar implementations. In an example, the techniques described herein may prevent implementations which multiply the buffer size of the crossbar by the total number of sub-crossbars included in the crossbar switch.

In some aspects, a bandwidth of a crossbar circuit according to example implementations described herein is equal to a summation of bandwidths of the plurality of sub-crossbar domains of the crossbar circuit. In some aspects, the summation of the bandwidths of a crossbar circuit according to example implementation described herein is equal total bandwidth of some other crossbar circuit implementations, while providing improved message rate.

Aspects of the disclosure are further illustrated by and described with reference to apparatus diagrams, system diagrams, and flowcharts that relate to spreading and balancing data over buffers, which may achieve high bandwidth capacity switching while mitigating increases in crossbar cell count.

Figure 1:
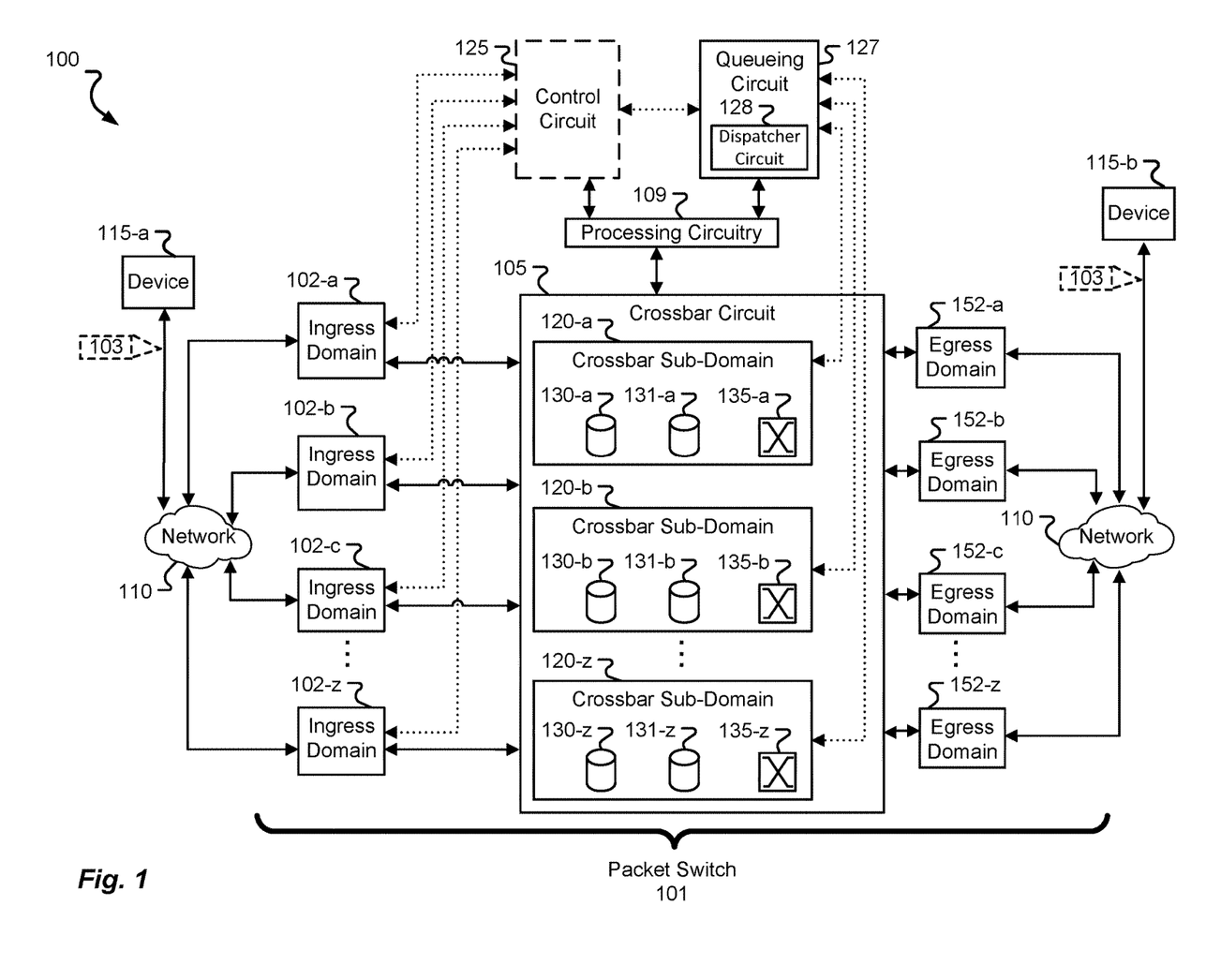
FIG. 1 illustrates an example of a system in accordance with aspects of the present disclosure.

FIG. 1 illustrates an example of a system 100 supported by aspects of the present disclosure. The system 100 may include a packet switch 101. The packet switch 101 may include ingress domains 102 (e.g., ingress domain 102-a through ingress domain 102-z), a crossbar circuit 105, and egress domains 152 (e.g., egress domain 152-a through egress domain 152-z). The packet switch 101 and/or crossbar circuit 105 may include control logic (e.g., control circuit 125) for setting up transfer paths for communicating packets or data between devices. For example, the packet switch 101 may communicate packets between different devices (e.g., communication devices, servers, etc.) connected to communications network 107. In an example, the packet switch 101 may be implemented as an on-die chip.

The system 100 may support the communication of data packets 103 between entities (e.g., devices 115, communication devices, server(s), etc.) of the system 100, for example, via one or more packet switches 101 and communications network 107. Aspects of the communications network 107 may be implemented by any appropriate communications network capable of facilitating machine-to-machine communications between entities (e.g., any appropriate number of devices, computing devices, communication devices, servers, etc.). For example, the communications network 107 may include any appropriate type of known communication medium or collection of communication media and may use any appropriate type of protocols to transport messages, signals, and/or data between endpoints. In some aspects, the communications network 107 may include wired communications technologies, wireless communications technologies, or any appropriate combination thereof. In some examples, the communications network 107 may support non-secure communication channels and secure communication channels.

The Internet is an example of a network (e.g., a communications network 107) supported by the system 100, and the network may constitute an Internet Protocol (IP) network consisting of multiple computers, computing networks, and other devices located in multiple locations. Other examples of networks supported by the system 100 may include, without limitation, a standard Plain Old Telephone System (POTS), an Integrated Services Digital Network (ISDN), the Public Switched Telephone Network (PSTN), a Local Area Network (LAN), a Wide Area Network (WAN), a wireless LAN (WLAN), a Session Initiation Protocol (SIP) network, a Voice over Internet Protocol (VOIP) network, Ethernet, InfiniBand™, a cellular network, and any other appropriate type of packet-switched or circuit-switched network known in the art. In some cases, the system 100 may include any appropriate combination of networks or network types. In some aspects, the networks may include any appropriate combination of communication mediums such as coaxial cable, copper cable/wire, fiber-optic cable, or antennas for communicating data (e.g., transmitting/receiving data).

In an example, the crossbar circuit 105 may include sub-crossbar domains 120 (e.g., sub-crossbar domain 120-a through sub-crossbar domain 120-z). Each sub-crossbar domain 120 may include a sub-crossbar circuit 135 of the crossbar circuit 105.

In some aspects, buffers (also referred to herein as memory areas or data buffers) associated with an ingress domain 102 may support storing or buffering data. For example, buffers 130 (e.g., buffer 130-a through buffer 130-z) may be associated with ingress domain 102-a, and buffers 131 (e.g., buffer 131-a through buffer 131-z) may be associated with ingress domain 102-z. For example, buffer 130-a through buffer 130-z (and similarly, buffer 131-a through buffer 131-z) may also be referred to herein as memory areas of a buffer space.

Aspects of the present disclosure support allocating the buffers (e.g., buffers 130, buffers 131, etc.) to different sub-crossbar domains 120. For example, buffers 130-a through buffer 130-z associated with ingress domain 102-a may be respectively allocated to sub-crossbar domain 120-a through sub-crossbar domain 120-z, and buffers 131-a through buffer 131-z associated with ingress domain 102-z may be respectively allocated to sub-crossbar domain 120-a through sub-crossbar domain 120-z.

In some example additional or alternative implementations, the packet switch 101 may include a control circuit 126 (also referred to herein as a central control circuit, a central control plain block, a central scheduler, a central scheduling circuit, or a central queuing system), a queueing circuit 127, and a dispatcher circuit 128. In some aspects, the control circuit 126 may maintain the ordering between all sub-crossbar domains 120, and the dispatcher circuit 128 may spread transmission jobs among the sub-crossbar domains 120. The transmission jobs may include routing of one or more packets 103 (e.g., routing packet data of the packets) from one or more of the ingress domains 102 to one or more of the egress domains 152. In some aspects, the control circuit 126 may perform one or more of the following functions: execute routing protocols, maintain forwarding tables, and monitor queues of egress ports 154 (later illustrated at FIG. 2).

Packet switch 101 may include processing circuitry 109. Processing circuitry 109 may perform one or more functions of the packet switch 101 described herein. In some non-limiting examples, the processing circuitry 109 may perform at least one or more of the following functions: data-link-layer functions, forwarding table lookup, and forwarding of network packets (e.g., packets 103) to the crossbar circuit 105 (and switch fabric). In some aspects, portions of the processing circuitry 109 may be included in the crossbar circuit 105.

In some cases, the packet switch 101 may be implemented with or without the control circuit 126. For example, the packet switch 101 may support the operations and techniques described herein without the control circuit 125 for cases including hash flow packet spreading. In some examples, the packet switch 101 may bypass use of the control circuit 125 for cases in which the packet switch 101 refrains from ordering the sub-crossbar domains 120 (e.g., no ordering between the sub-crossbar domains 120 is involved or required).

It is to be understood that ingress ports 104 (later illustrated at FIG. 2) associated with the ingress domains 102, crossbar circuit 105, processing circuitry 109, control circuit 125, queueing circuit 127, dispatcher circuit 128, and egress ports 154 (later illustrated at FIG. 2) associated with the egress domains 152, may be electrically coupled for example, via a communication bus or system bus of the packet switch 101. For simplicity, connections between the processing circuitry 109, the ingress ports 104, and the egress ports 154 are not illustrated herein. Example functions of the ingress ports 104, crossbar circuit 105, processing circuitry 109, control circuit 125, queueing circuit 127, dispatcher circuit 128, and egress ports 154 are explained in greater detail herein.

Figure 2:
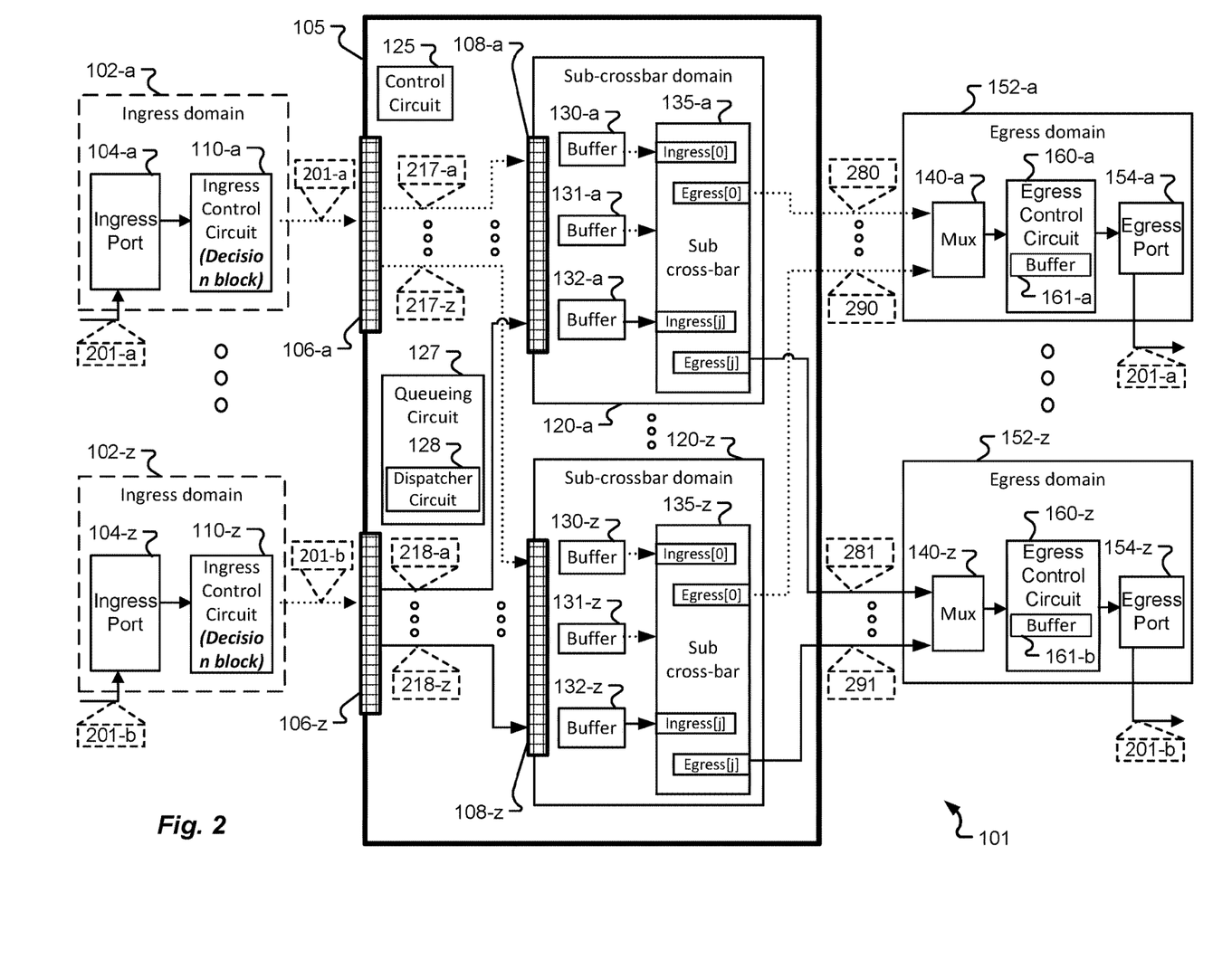
FIG. 2 illustrates an example of a crossbar circuit in accordance with aspects of the present disclosure.

FIG. 2 illustrates an example of the packet switch 101 in accordance with aspects of the present disclosure.

Each of the ingress domains 102 (e.g., ingress domain 102-a through ingress domain 102-z) may include an ingress port 104, a crossbar control circuit 125, and an ingress control circuit 110 (also referred to herein as an "ingress buffer scatter circuit"). For example, ingress domain 102-a may include ingress port 104-a, control circuit 125, and ingress control circuit 110-a.

Each of the egress domains 152 (e.g., egress domain 152-a through egress domain 152-z) may include a multiplexer device 140, an egress control circuit 160, and an egress port 154. For example, egress domain 152-a may include multiplexer device 140-a, egress control circuit 160-a, and egress port 154-a. Each of the egress domains 152 may include a buffer 161 for buffering data exiting egresses of the sub-crossbar circuits 135 of the crossbar circuit 105. In some aspects, for each egress domain 152 (e.g., egress domain 152-a), the respective buffer 161 (e.g., buffer 161-a) may be integrated with or separate from the egress control circuit 160 (e.g., egress control circuit 160-a).

The sub-crossbar domains 120 and sub-crossbar circuits 135 support routing to a designated output (e.g., egress domain 152, egress control circuit 160, an egress port 154, etc.). In some cases, the sub-crossbar domains 120 and sub-crossbar circuits 135 may be referred to as an interconnection fabric, a fabric plane, an interconnect network, a communication network, or the like.

Aspects of the present disclosure support allocating any appropriate quantity of buffers to each sub-crossbar domain 120. For example, aspects of the present disclosure support allocating, to each sub-crossbar domain 120 (e.g., sub-crossbar domain 120-a), multiple buffers (e.g., one or more buffers 130, one or more buffers 131, etc.) that are respectively associated with different ingress domains 102. In an example, buffer 130-a through buffer 130-z may be associated with ingress domain 102-a, and buffer 130-a through buffer 130-z may be respectively allocated to sub-crossbar domain 120-a through sub-crossbar domain 120-z. In another example, buffer 131-a through buffer 131-z may be associated with ingress domain 102-z, and buffer 131-a through buffer 131-z may be respectively allocated to sub-crossbar domain 120-a through sub-crossbar domain 120-z.

The ingress control circuits 110 may support segmenting variable sized packets (e.g., a packet 201-a, a packet 201-b, etc.) into fixed size cells. In some aspects, the cells may be referred to as packet data (e.g., packet data 217, packet data 218, etc.) described herein. The ingress control circuits 110 support scattering the cells among buffers (e.g., buffers 130, buffers 131, etc.), aspects of which are later described herein. The egress control circuits 160 may support reordering to recover the ingress order and reassembly of the cells into the packets, aspects of which are later described herein.

It is to be understood that example aspects of the present disclosure support any appropriate quantity of ingress domains 102, buffers (e.g., buffer 130, buffer 131, etc.), sub-crossbar domains 120, sub-crossbar circuits 135, and egress domains 152 described herein.

The crossbar circuit 105 may include any appropriate quantity of the components (e.g., multiplexer devices 106, multiplexer devices 108, ingress control circuits 110, sub-crossbar domains 120, crossbar control circuits 125, buffers 130, buffers 131, sub-crossbar circuits 135, multiplexer devices 140, egress control circuits 160, etc.) described herein. The components of the packet switch 101 may communicate with one another over a system bus (e.g., control busses, address busses, data busses, etc.).

The crossbar circuit 105 (also referred to herein as a crossbar switch core) may transfer data packets between respective ingress ports 104 and egress ports 154. For example, control circuit 125 may control the operation of crossbar circuit 105 to transfer each received packet (e.g., packet 103) in turn to the appropriate egress port 154. The crossbar circuit 105 may include a switch fabric and may selectively connect the ingress ports 104 with the egress ports 154 according to at least destination addresses of received network packets (e.g., packets 201) and perform queuing functions (e.g., via queueing circuit 127). Upon receiving an incoming packet (e.g., packet 201-a, packet 201-b, etc.) from the communications network 107, the ingress port 104 queues the packet and signals the control circuit 125.

An example implementation of routing one or more packets 201 using the packet switch 101 is described herein with reference to FIG. 2. The ingress control circuits 110 may distribute (e.g., spread) packets 201 among the sub-crossbar domains 120 and the sub-crossbar circuits 135. In an example described with reference to ingress domain 102-a, the ingress control circuit 110-a may provide (or scatter) packet data 217 associated with a packet 201-a to buffers 130 allocated to the sub-crossbar circuits 135.

For example, the ingress control circuit 110-a may provide packet data 217-a to buffer 130-a allocated to sub-crossbar circuit 135-a and provide packet data 217-z to buffer 130-z allocated to sub-crossbar circuit 135-z. In another example, the ingress control circuit 110-z associated with ingress domain 102-z may provide (or scatter) packet data 217 associated with a packet 201-b, providing packet data 218-a to buffer 131-a allocated to sub-crossbar circuit 135-a and providing packet data 218-z to buffer 131-z allocated to sub-crossbar circuit 135-z. Each the ingress control circuit 110 (e.g., ingress control circuit 110-a, ingress control circuit 110-z, etc.) may provide (or scatter) packet data via a multiplexer device 106 and a multiplexer device 108 as described herein.

For example, the crossbar circuit 105 may include a respective multiplexer device 106 at an interface between each ingress domain 102 and the crossbar circuit 105. In an example, the crossbar circuit 105 may include a multiplexer device 106-a at an interface between ingress domain 102-a and the crossbar circuit 105, a multiplexer device 106-z at an interface between each ingress domain 102-z and the crossbar circuit 105, and the like. The crossbar circuit 105 may include a respective multiplexer device 108 at an interface associated with each sub-crossbar domain 120. For example, the crossbar circuit 105 may include a multiplexer device 108-a at an interface associated with the sub-crossbar domain 120-a, a multiplexer device 108-z at an interface associated with the sub-crossbar domain 120-z, and the like.

The multiplexer devices 106 and multiplexer devices 108 may distribute or provide packet data of an incoming packet (e.g., packet 201-a, packet 201-b, etc.) to a crossbar domain 120 and buffers of the crossbar domain 120 based on control signals from the ingress control circuits 110. In an example, based on one or more control signals from ingress control circuit 110-a, multiplexer device 106-a may distribute or provide packet data 217-a of packet 201-a to crossbar domain 120-a (e.g., to multiplexer device 108-a of the crossbar domain 120-a), and further, distribute or provide packet data 217-z of packet 201-a to crossbar domain 120-z (e.g., to multiplexer device 108-z of the crossbar domain 120-z).

Based on one or more control signals from ingress control circuit 110-a (or one or more control signals from processing circuitry 109 or control circuitry of the crossbar circuit 105), multiplexer device 108-a may further distribute or provide packet data 217-a (or data bits included in the packet data 217-a) to a buffer (e.g., buffer 130-a, buffer 131-a, buffer 132-a, etc.) allocated to the crossbar domain 120-a. In another example, based on one or more control signals from ingress control circuit 110-a (or one or more control signals from processing circuitry 109 or control circuitry of the crossbar circuit 105), multiplexer device 108-z may further distribute or provide packet data 217-z (or data bits included in the packet data 217-z) to a buffer (e.g., buffer 130-z, buffer 131-z, buffer 132-z, etc.) allocated to the crossbar domain 120-z.

Each of the multiplexer devices 106 and 108 may be an all-to-all multiplexer circuit. Via the multiplexer devices 106 and multiplexer devices 108, one or more ingress ports 104 and/or one or more ingress control circuits 110 may distribute packet data described herein to one or more buffers and one or more sub-crossbar domains 120.

Aspects described herein with reference to the ingress domain 102-a, ingress control circuit 110-a, packet 201-a, and packet data 217 (e.g., packet data 217-a, packet data 217-z, etc.) may be similarly applied to other packets 201 and other ingress domains 102. For example, as described herein may be similarly applied to the ingress domain 102-z, ingress control circuit 110-z, packet 201-b, and packet data 218 (e.g., packet data 218-a, packet data 218-z, etc.).

In some aspects, the ingress control circuit 110-a may distribute the packet 201-a by balancing the packet data 217 (e.g., packet data 217-a, packet data 217-z, etc.) among the buffers 130. In some examples, the balancing may be based on a random selection or pseudo-random selection of the buffers 130. In some other examples, the balancing may be based on a cyclic selection of the buffers 130 (e.g., based on a temporal schedule, based on a selection order of the buffers 130, etc.).

Example aspects of the balancing and random selection described herein may be implemented using pseudo-random selection. In some aspects, aspects of the present disclosure support implementing the pseudo-random selection using a deterministic process based on one or more mathematical formulas. For example, the pseudo-random selection may include statistical properties similar to a true random selection. In some cases, the pseudo-random selection may appear random but be deterministic such that selection of a particular buffer or sub-crossbar domain 120 (e.g., in association with distributing packet 201-a and balancing packet data 217) will repeat or cycle after a certain period of time or certain quantity of selections.

In an example, the ingress control circuit 110-a may select (e.g., randomly, pseudo-randomly, cyclically, etc.) buffer 130-a, provide packet data 217-a to the buffer 130-a, select buffer 130-z, and provide packet data 217-b to the buffer 130-z. In an example, the ingress control circuit 110-a may continue to select buffers 130 (e.g., a buffer 130-b (illustrated in FIG. 1), a buffer 130-c (not illustrated), etc.) and distribute packet data 217 until the ingress control circuit 110-a has distributed all data associated with the packet 201-a or until some other criteria is satisfied. Non-limiting examples of the criteria are described herein.

For example, the ingress control circuit 110-a may provide the packet data 217 (e.g., packet data 217-a, packet data 217-b, etc.) to the buffers 130 based on input bandwidths that are associated with the buffers 130 and/or sub-crossbar domains 120. In an example, the ingress control circuit 110-a may distribute the packet data 217 among a quantity of buffers 130 such that the cumulative input bandwidth of the buffers 130 is equal to the input bandwidth associated with the ingress domain 102-a (and ingress port 104-a).

In some aspects, the ingress control circuit 110-a may provide packet data 217-a to sub-crossbar circuit 135-a while refraining from exceeding a collective buffer space (e.g., of buffer 130-a, buffer 131-a, buffer 132-a) and/or bandwidth allocation associated with the sub-crossbar circuit 135-a. In another example, the ingress control circuit 110-a may provide packet data 217-z to sub-crossbar circuit 135-z so while refraining from exceeding a collective buffer space (e.g., of buffer 130-z, buffer 131-z, buffer 132-z) and/or bandwidth allocation associated with the sub-crossbar circuit 135-z.

In another example aspect, the ingress control circuit 110-a may distribute the packet 201-a among the buffers 130 based on respective bandwidth capabilities corresponding to the buffers 130 and the respective sub-crossbar domains 120. For example, the ingress control circuit 110-a may provide packet data 217-a of the packet 201-a to buffer 130-a so as not to exceed the bandwidth capability corresponding to the buffer 130-a and the sub-crossbar domain 120-a. In an example, if the ingress control circuit 110-a determines that the bandwidth capability of the buffer 130-a and the sub-crossbar domain 120-a is reached, the ingress control circuit 110-a may further distribute the packet 201-a by providing packet data 217-z to buffer 130-z, and/or providing other packet data 217 to one or more other buffers 130 of other sub-crossbar domains 120.

In another example, with reference to sub-crossbar domain 120-a, if the ingress control circuit 110-a determines that the bandwidth capabilities of all buffers (e.g., buffer 130-a, buffer 131-a, and buffer 132-a) of sub-crossbar domain 120-a has been reached, the ingress control circuit 110-*a* may pause the distribution of packet data 217-*a* to the sub-crossbar domain 120-*a* until bandwidth becomes available at one or more of the buffers.

Accordingly, for example, the ingress control circuit 110-*a* may provide packet data 217 (e.g., packet data 217-*a*, packet data 217-*b*, packet data 217-*c*, . . . , packet data 217-*z*, etc.) to one or more buffers (e.g., buffer 130-*a*, buffer 131-*b*, buffer 132-*a*, etc.) such that the respective bandwidth capabilities of the buffers at each sub-crossbar domain 120 and/or the overall bandwidth capabilities of the sub-crossbar domains 120 are not exceeded.

In some aspects, each buffer 130 may be configurable. For example, the ingress control circuit 110-*a* may set respective buffer thresholds associated with the one or more buffers (e.g., buffers 130, buffers 131, buffers 132, etc.) described herein. In some examples, a buffer threshold of a buffer 130 (e.g., buffer 130-*a*) may be a usage threshold that is equal to or less than a total buffer space allocated to the buffer 130. In an example of distributing packet data 217 (e.g., packet data 217-*a*, packet data 217-*b*, packet data 217-*c*, . . . , packet data 217-*z*, etc.) of packet 201-*a* among buffers (e.g., buffers 130, buffers 131, buffers 132, etc.), the ingress control circuit 110-*a* may distribute the packet data 217 such that the respective buffer thresholds of the buffers are not exceeded by respective buffer usages. Accordingly, for example, the ingress control circuit 110-*a* may distribute the packet data 217 according to buffer thresholds and buffer usage. In some aspects, the ingress control circuit 110-*a* may distribute the packet data 217 based on available buffer credits (available buffer space) associated with each of the buffers (e.g., buffers 130, buffers 131, buffers 132, etc.).

Through the example techniques described herein, the packet switch 101 may spread incoming data (e.g., packets 201, packet data 217, packet data 218, etc.) in a manner that both gives randomness or pseudo-randomness and balance between buffers (e.g., buffers 130, buffers 131, buffers 132, etc.) distributed among multiple sub-crossbar domains 120. Referring to the example sub-crossbar domains 120, the ingress control circuit 110-*a* may spread incoming data in a manner that both gives randomness or pseudo-randomness and balance between buffers (e.g., buffer 130-*a*, . . . , buffer 130-*z*, etc.) that are respectively allocated to the sub-crossbar domains 120. In another example, the ingress control circuit 110-*z* may spread incoming data in a manner that both gives randomness or pseudo-randomness and balance between buffers (e.g., buffer 130-*a*, . . . , buffer 130-*z*, etc.) that are respectively allocated to the sub-crossbar domains 120.

The techniques described herein of spreading and balancing data over buffers of each sub-crossbar domain 120 may support a reduced collective buffer size (e.g., of one or more buffers 130, one or more buffers 131, one or more buffers 132, etc.) allocated in association with each sub-crossbar domain 120 and corresponding sub-crossbar circuit 135 compared to other systems. For example, for a sub-crossbar domain 120 (e.g., sub-crossbar domain 120-*a*) of the crossbar circuit 105, the cumulative buffer size of buffers allocated to the sub-crossbar domain 120 may have a reduced buffer size compared to buffers implemented in association with crossbar circuits and sub-crossbar circuits of other systems.

That is, for example, aspects of the distribution of packet data 217 (and similarly, packet data 218 of packet 201-*b*) among different buffers allocated to different sub-crossbar domains 120 may be implemented in crossbar circuits without increasing the existing available buffer space. Stated another way, aspects of balancing data over the buffers of each sub-crossbar domain 120 may prevent increases in buffer size that include multiplying buffer size by the number of sub-crossbar domains 120.

Aspects of the packet switch 101 support data reordering prior to egress. For example, aspects of the packet switch 101 may support data ordering or reordering at the egress domains 152 based on an attribute in which packet data associated with a packet 201-*a* is spread among sub-crossbar domains 120 of the crossbar circuit 105. Example aspects of the modes are later described herein.

The ingress control circuit 110-*a* may distribute packet data (e.g., provide packet data 217-*a*, . . . , packet data 217-*z*, etc.) to sub-crossbar domains 120 via multiplexer device 106-*a*. Via multiplexer device 108-*a*, the ingress control circuit 110-*a* may distribute data bits included in the packet data among buffers (e.g., buffer 130-*a*, . . . , buffer 130-*z*, etc.) respectively allocated to the sub-crossbar domains 120. The crossbar control circuit 125 may control the sub-crossbar circuits 135 to route the data bits to multiplexer device 140-*a* of the egress domain 152-*a*. That is, for example, the sub-crossbar circuit 135-*a* may route data bits 280 of packet data 217-*a* to the multiplexer device 140-*a*, and the sub-crossbar circuit 135-*z* may route data bits 290 of packet data 217-*z* to the multiplexer device 140-*a*. In another example, the sub-crossbar circuit 135-*z* may route data bits 281 of packet data 218-*a* to multiplexer device 140-*z*, and the sub-crossbar circuit 135-*z* may route data bits 291 of packet data 218-*z* to the multiplexer device 140-*z*.

In some cases, as a result of the distribution of the packet data (e.g., packet data 217-*a*, packet data 217-*z*, etc.) and corresponding data bits (e.g., data bits 280, data bits 290, etc.) and the routing of the data bits by the sub-crossbar circuits 135, the data bits may arrive at the multiplexer device 140-*a* and/or be output by the multiplexer device 140-*a* in an order different from the first order in which the data bits were initially ordered. In an example, the egress control circuit 160-*a* may assemble and reorder the data bits according to the first order in which the data bits were received at the ingress control circuit 110-*a*, thereby reassembling packet 201-*a*. The egress control circuit 160-*a* may provide the packet 201-*a* to the egress port 154-*a*, and the packet switch 101 may output the packet 201-*a*.

As described herein, aspects of the present disclosure support bandwidth distribution among multiple sub-crossbar domains 120, and further, bandwidth distribution among buffers (e.g., buffers 130, buffers 131, buffers 132, etc.) allocated to sub-crossbar domains 120. In some example implementations described herein, the total bandwidth of a sub-crossbar domain 120 (e.g., sub-crossbar domain 120-*a*) may be equal to the bandwidth supported by the buffers allocated to the sub-crossbar domain 120.

According to example implementations of a packet switch 101 as supported by aspects of the present disclosure, the crossbar circuit 105 may be divided into sub-crossbar domains 120 (e.g., sub switch domains). The packet switch 101 may spread an incoming packet 201 (and packet data 217 of the packet 201) over one or more sub-crossbar domains 120 on the ingress side of the one or more sub-crossbar domains 120. The packet switch 101 may re-order the packets 201 (and packet data 217) back from the relevant egress of every sub-crossbar domain 120.

In some aspects, the packet switch 101 may divide the incoming packet 201 into cells (e.g., packet data 217-*a* through packet data 217-*z*, packet data 218-*a* through packet data 218-*z*, etc.). In some examples, each of the sub-crossbar domains 120 are not limited to holding an entire system bandwidth. For example, each of the sub-crossbar domains 120 may support or hold a proportional amount of the system bandwidth. In an example, the bandwidth of a sub-crossbar domain 120 may be equal to the system bandwidth divided by the quantity of sub-crossbar domains 120. In some example implementations, one or more of the sub-crossbar domains 120 may be a network-on-chip (NoC), a central scheduling circuit, or another implementation.

The packet switch 101 may spread the incoming packet 201 (and packet data 217-a through packet data 217-z of the packet 201) over one or more sub-crossbar domains 120 using any appropriate combination of spreading techniques described herein. For example, the spreading techniques may include any appropriate combination of: random spreading, pseudo-random spreading, flow hash based spreading, bandwidth spreading, cyclic based spreading, and buffer occupancy spreading. In an example implementation in which the packet switch 101 uses a hash based flow (e.g., hashing based on flow IDs) to spread a packet 201 (and packet data 217-a through packet data 217-z) over the sub-crossbar domains 120, the packet switch 101 may preserve FIFO ordering, and the packet switch 101 may refrain from egress reordering. For example, for an egress control circuit 160 receiving data bits from egresses of one or more sub-crossbar domains 120, the egress control circuit 160 may refrain from reordering the data bits.

An example implementation is described herein with respect to a packet 201-a that supports ordering of packet data 217-a through packet data 217-z according to a target order, without using hash spreading based on the flow to spread the packet 201 (e.g., packet data 217-a through packet data 217-z) between the sub-crossbar domains 120. The target order may be an initial order of the packet data 217-a through packet data 217-z. The implementation may include a queueing circuit 127 (also referred to herein as a central queueing circuit or central queueing system) with a dispatcher circuit 128 at the end. The queueing circuit 127 and dispatcher circuit 128 may spread transmission jobs between the sub-crossbar domains 120, providing a mechanism that will transfer the packet 201-a to an egress (e.g., to an egress port 154). In some aspects, the dispatcher circuit 128 may spread transmission jobs between the sub-crossbar domains 120 according to the target order. The dispatcher circuit 128 may allocate buffer space in final egress reorder buffers (e.g., buffer 161-a, buffer 161-z, etc.).

The techniques described herein may provide improved message rate without changing existing infrastructures while mitigating or preventing increases in buffer size associated with a packet switch. For example, the packet 201-a may be a message, and the ingress control circuit 110-a may partition the message into packet data 217 (e.g., packet data 217-a, packet data 217-b, etc.). By distributing the packet data 217 among buffers 130 as described herein, such that the packet data 217 (e.g., packet data 217-a, packet data 217-b, etc.) is respectively routed by different sub-crossbar circuits 135, the packet switch 101 may effectively split the ingress port 104-a over multiple buffers and transfer the message at a target message rate, without increasing overall buffer size. In some aspects, the ingress port 104-a and ingress control circuit 110-a may manage the buffers 130 and sub-crossbar domains 120 as single buffer from a port perspective.

Figure 3:
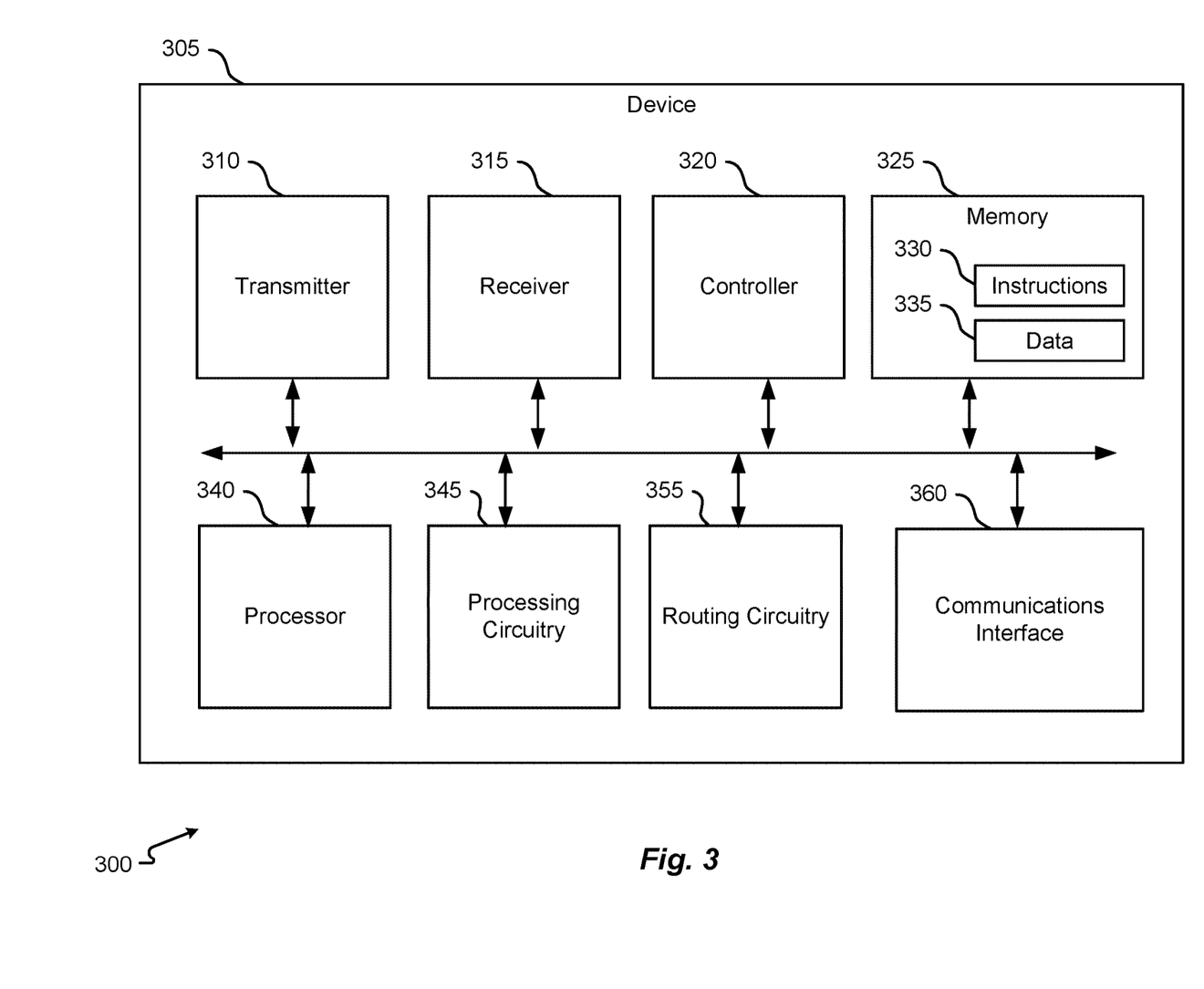
FIG. 3 illustrates an example of a system in accordance with aspects of the present disclosure.

FIG. 3 illustrates an example of a system 300 in accordance with aspects of the present disclosure. The system 300 may include a device 305. In some cases, the device 305 may be referred to as a computing resource. The device 305 may perform any appropriate or all of the operations described in the present disclosure. The device 305 may implement aspects of a packet switch 101 described herein.

The device 305 may include a transmitter 310, a receiver 315, a controller 320, a memory 325, a processor 340, processing circuitry 345, routing circuitry 355, and a communications interface 360. In some examples, components of the device 305 (e.g., transmitter 310, receiver 315, controller 320, memory 325, processor 340, processing circuitry 345, routing circuitry 355, communications interface 360, etc.) may communicate over a system bus (e.g., control busses, address busses, data busses, etc.) included in the device 305. It is to be understood that aspects of the present disclosure may support omitting any of the components of the device 305, including additional instances of the components of the device 305, or including additional components not illustrated in FIG. 3. For example, in the case of a packet switch (e.g., packet switch 101), one or more functions of the device 305 may be implemented by processing circuitry 345 and routing circuitry 355, without processor 340.

The transmitter 310 and the receiver 315 may support the transmission and reception of signals to and from the device 305. In some aspects, the transmitter 310 and the receiver 315 may support the transmission and reception of signals within the device 305. The transmitter 310 and receiver 315 may be collectively referred to as a transceiver. An antenna may be electrically coupled to the transceiver. The device 305 may also include (not shown) multiple transmitters 310, multiple receivers 315, multiple transceivers and/or multiple antennas.

The controller 320 may be located on the same chip (e.g., ASIC chip) as the transmitter 310 and/or the receiver 315. In some cases, the controller 320 may be located on a different chip as the transmitter 310 and/or the receiver 315. In some examples, the controller 320 may be located on a chip of or on a chip of another device 305. In some examples, the controller 320 may be a programmed microprocessor or microcontroller. In some aspects, the controller 320 may include one or more CPUs, memory, and programmable I/O peripherals. The controller 320 may control the routing circuitry 355 to route data according to the techniques described herein.

The memory 325 may be any appropriate electronic component capable of storing electronic information. The memory 325 may be, for example, random access memory (RAM), read-only memory (ROM), magnetic disk storage media, optical storage media, flash memory devices in RAM, on-board memory included with the processor, EPROM memory, EEPROM memory, registers, and so forth, including combinations thereof.

The memory 325 may include instructions 330 (computer readable code) and data 335 stored thereon. The instructions 330 may be executable by the processor 340 to implement the methods disclosed herein. In some aspects, execution of the instructions 330 may involve one or more portions of the data 350. In some examples, when the processor 340 executes the instructions 330, various portions of the instructions 330 and/or the data 335 may be loaded onto the processor 340.

The processor 340 may correspond to one or multiple computer processing devices. For example, the processor 340 may include a silicon chip, such as a Field Programmable Gate Array (FPGA), an ASIC, any other appropriate type of Integrated Circuit (IC) chip, a collection of IC chips, or the like. In some aspects, the processors may include a microprocessor, a Central Processing Unit (CPU), a Graphics Processing Unit (GPU), or plurality of microprocessors configured to execute instructions sets stored in a corresponding memory (e.g., memory 325 of the device 305). For example, upon executing the instruction sets stored in memory 325, the processor 340 may enable or perform one or more functions of the device 305. In some examples, a combination of processors 340 (e.g., an advanced reduced instruction set computer (RISC) machine (ARM) and a digital signal processor (DSP)) may be implemented in the device 305.

The processing circuitry 345 may enable or perform one or more functions of the device 305. For example, the processing circuitry 345 may implement aspects of a packet switch (e.g., packet switch 101) and components thereof (e.g., processing circuitry 109, etc.) described herein.

The routing circuitry 355 may implement aspects of a packet switch (e.g., packet switch 101) and crossbar circuit (e.g., crossbar circuit 105) described herein.

The communications interface 360 may support interactions (e.g., via a physical or virtual interface) between a user and the device 305.

According to example aspects of the present disclosure as described herein, an apparatus (e.g., packet switch 101) is described including: a crossbar circuit 105 that routes one or more packets 201 between one or more ingress domains 102 and one or more egress domains 152 associated with the apparatus one or more ingress control circuits 110 associated with the one or more ingress domains 102. In some aspects, the one or more ingress control circuits 110 are to distribute packet data (e.g., packet data 217, packet data 218, etc.) of the one or more packets 201 to a plurality of sub-crossbar domains 120 comprised in the crossbar circuit 105; and an egress control circuit 160 associated with an egress domain 152 (e.g., egress domain 152-a) of the one or more egress domains 152. In some aspects, the egress control circuit 160 is to receive data bits associated with the packet data from egresses associated with the plurality of sub-crossbar domains 120.

In some aspects, the one or more ingress control circuits 110 are to spread the packet data of the one or more packets 201 among the plurality of sub-crossbar domains 120 based on at least one criterion.

In some aspects, the one or more ingress control circuits 110 are to spread the packet data of the one or more packets 201 among the plurality of sub-crossbar domains 120 based on: a random spreading of the packet data among the plurality of sub-crossbar domains 120; a pseudo-random spreading of the packet data among the plurality of sub-crossbar domains 120; a flow hash based spreading of the packet data among the plurality of sub-crossbar domains 120; a bandwidth spreading of the packet data among the plurality of sub-crossbar domains 120; a cyclic based spreading of the packet data among the plurality of sub-crossbar domains 120; buffer occupancy associated with the plurality of sub-crossbar domains 120; or a combination thereof.

In some aspects, the packet data of the one or more packets 201 is spread among buffers (e.g., a buffer 130, a buffer 131, a buffer 132, etc.) associated with at least one sub-crossbar domain 120 (e.g., sub-crossbar domain 120-a, etc.) of the plurality of sub-crossbar domains 120 based on: one or more control signals from an ingress control circuit 110 (e.g., ingress control circuit 110-a) of the one or more ingress control circuits 110; or one or more second control signals from control circuitry of the crossbar circuit 105.

In some aspects, the one or more ingress control circuits 110 are to: set respective buffer thresholds associated with a plurality of buffers (e.g., buffers 130, buffers 131, buffers 132, etc.) allocated to the plurality of sub-crossbar domains 120; and distribute the packet data among the plurality of buffers based on satisfying at least one buffer threshold of the respective buffer thresholds.

In some aspects, the egress control circuit 160 is to: reorder the data bits received from the egresses of the plurality of sub-crossbar domains based on an ordering (e.g., an ordering scheme associated with the data bits); or refrain from reordering the data bits received from the egresses of the plurality of sub-crossbar domains 120. In some aspects, the egress control circuit reorders the data bits or refrains from reordering the data bits based on an attribute associated with the distribution of the packet data of the one or more packets 201.

In some aspects, the attribute may include a mode associated with processing a packet 201 received at the apparatus. In an example, the mode may include preserving FIFO ordering (e.g., for packets 201 within a packet flow). In another example, the mode may include refraining from preserving FIFO ordering (e.g., for other packets 201 within a different packet flow).

In some aspects, for flow hash based spreading of the packet data of a packet 201, attributes of the flow include refraining from preserving FIFO ordering of the packet data. Accordingly, for example, the egress control circuit may perform reordering of received data bits in association with reconstructing the packet 201.

In another example, the attribute may be a device attribute of the packet switch 101. For example, the packet switch 101 may be a device that does not rely on preserving FIFO ordering.

In some aspects, the apparatus may include one or more queueing circuits 127 including a dispatcher circuit 128. In some aspects, the dispatcher circuit 128 is to spread a set of transmission jobs among the plurality of sub-crossbar domains 120. In some aspects, the set of transmission jobs are associated with routing the packet data of the one or more packets 201 between a buffer domain of each sub-crossbar domain and the one or more egress domains 152. According to some example aspects of a transmission job described herein, a SOURCE: {sub crossbar domain, buffer, data packet position} and a TARGET: {egress domain, egress ordering domain id}=transmission job.

In some aspects, the dispatcher circuit 128 is to: spread the set of transmission jobs among the plurality of sub-crossbar domains 120 based on a target order indicated by the one or more queueing circuits 127; and allocate buffer space in an egress reorder buffer (e.g., buffer 161) associated with the egress domain 152.

In some aspects, the one or more ingress control circuits 110 are to provide one or more control signals associated with: distributing first packet data (e.g., packet data 217-a) of the one or more packets 201 to a first sub-crossbar domain 120 (e.g., sub-crossbar domain 120-a) of the plurality of sub-crossbar domains 120; and distributing second packet data (e.g., packet data 217-z) of the one or more packets 201 to a second sub-crossbar domain 120 (e.g., sub-crossbar domain 120-z) of the plurality of sub-crossbar domains 120.

In some aspects, the crossbar circuit 105 is to: route first packet data 217 (e.g., packet data 217-a) of the one or more packets 201, via a first sub-crossbar domain 120 (e.g., sub-crossbar domain 120-a) of the plurality of sub-crossbar domains 120, to a multiplexer device 140 (e.g., multiplexer device 140-a) associated with an egress domain 152 (e.g., egress domain 152-a) of the one or more egress domains 152; and route second packet data 217 (e.g., packet data 217-z) of the one or more packets 201, via a second sub-crossbar domain 120 (e.g., sub-crossbar domain 120-*z*) of the plurality of sub-crossbar domains 120, to the multiplexer device 140.

In some aspects, the crossbar circuit 105 may include: a multiplexer device 106 (e.g., multiplexer device 106-*a*) to, based on one or more control signals from an ingress control circuit 110 (e.g., ingress control circuit 110-*a*) of the one or more ingress control circuits 110, provide packet data (e.g., packet data 217-*a*) of the one or more packets 201 to a sub-crossbar domain 120 (e.g., sub-crossbar domain 120-*a*) of the plurality of sub-crossbar domains 120; and a second multiplexer device 108 (e.g., multiplexer device 108-*a*) to distribute the packet data (e.g., packet data 217-*a*) among buffers of the sub-crossbar domain 120. In some aspects, the second multiplexer device 108 (e.g., multiplexer device 108-*a*) may distribute the packet data (e.g., packet data 217-*a*) among the buffers based on the one or more control signals from the ingress control circuit 110. In some other aspects, the second multiplexer device 108 (e.g., multiplexer device 108-*a*) may distribute the packet data (e.g., packet data 217-*a*) among the buffers based on control signals from processing circuitry 109 of the crossbar circuit 105 or control circuitry of the crossbar circuit 105.

Figure 4:
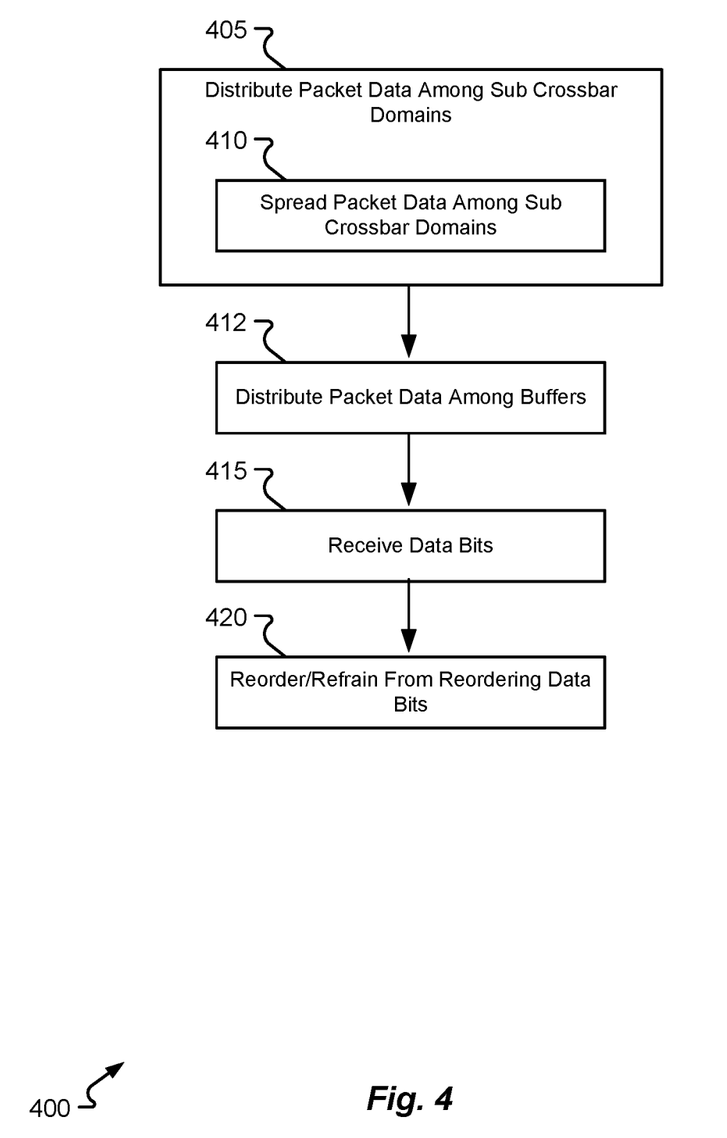
FIG. 4 illustrates an example process flow in accordance with aspects of the present disclosure.

FIG. 4 illustrates an example of a process flow 400 in accordance with aspects of the present disclosure. In some examples, process flow 400 may be implemented by aspects of a packet switch 101 or a device 305 described with reference to FIGS. 1 through 3. For example, aspects of the process flow 400 may be implemented by processing circuitry 109 or processing circuitry 345 described herein.

In the following description of the process flow 400, the operations may be performed in a different order than the order shown, or the operations may be performed in different orders or at different times. Certain operations may also be left out of the process flow 400, or other operations may be added to the process flow 400.

Example aspects of the process flow 400 may be implemented by an apparatus including: a crossbar circuit and processing circuitry. In some aspects, the crossbar circuit routes one or more packets between one or more ingress domains and one or more egress domains associated with the apparatus, and the crossbar circuit includes a plurality of sub crossbar domains.

At 405, the process flow 400 may include distributing, by one or more ingress control circuits associated with the one or more ingress domains, packet data of one or more packets to the plurality of sub crossbar domains.

At 410, the process flow 400 may include spreading, by the one or more ingress control circuits, the packet data of the one or more packets among the plurality of sub crossbar domains based on at least one criterion.

For example, at 410, the process flow 400 may include spreading, by the one or more ingress control circuits, the packet data of the one or more packets among the plurality of sub crossbar domains based on: a random spreading of the packet data among the plurality of sub crossbar domains; a pseudo-random spreading of the packet data among the plurality of sub-crossbar domains; a flow hash based spreading of the packet data among the plurality of sub crossbar domains; a bandwidth spreading of the packet data among the plurality of sub crossbar domains; a cyclic based spreading of the packet data among the plurality of sub-crossbar domains; buffer occupancy associated with each sub crossbar domain of the plurality of sub crossbar domains; or a combination thereof.

In another example, at 410, the process flow 400 may include spreading the packet data of the one or more packets among buffers associated with at least one sub crossbar domain of the plurality of sub crossbar domains based on: one or more control signals from an ingress control circuit of the one or more ingress control circuits; or one or more second control signals from processing circuitry of the crossbar circuit.

In some examples, at 412, the process flow 400 may include distributing, by the one or more ingress control circuits, the packet data among a plurality of buffers allocated to the plurality of sub crossbar domains based on satisfying at least one buffer threshold of the respective buffer thresholds. For example, the process flow 400 may include setting, by the one or more ingress control circuits, respective buffer thresholds associated with the plurality of buffers.

At 415, the process flow 400 may include receiving, by an egress control circuit associated with an egress domain of the one or more egress domains, data bits associated with the packet data from egresses associated with the plurality of sub crossbar domains.

At 420, the process flow 400 may include reordering the data bits received from the egresses of the plurality of sub crossbar domains based on an ordering; or refraining from reordering the data bits. In an example, the processing circuitry reorders the data bits or refrains from reordering the data bits based on an attribute associated with the distribution of the packet data of the one or more packets.

Any of the steps, functions, and operations discussed herein can be performed continuously and automatically.

The exemplary apparatuses, systems, and methods of this disclosure have been described in relation to examples of a crossbar circuit. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

It will be appreciated from the descriptions herein, and for reasons of computational efficiency, that the components of devices and systems described herein can be arranged at any appropriate location within a distributed network of components without impacting the operation of the device and/or system.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed examples, configuration, and aspects.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

In at least one example, architecture and/or functionality of various previous figures are implemented in context of a general computer system, a circuit board system, a game console system dedicated for entertainment purposes, an application-specific system, and more. In at least one example, the computer system may take the form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other appropriate type of logic.

Other variations are within the spirit of present disclosure. Thus, while disclosed techniques are susceptible to various modifications and alternative constructions, certain illustrated examples thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed examples (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one example, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any appropriate nonempty subset of set of A and B and C. For instance, in an illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain examples require at least one of A, at least one of B and at least one of C each to be present. In addition, unless otherwise noted or contradicted by context, term "plurality" indicates a state of being plural (e.g., "a plurality of items" indicates multiple items). In at least one example, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one example, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one example, code is stored on a computer-readable storage medium, for example, in form of a computer program comprising a plurality of instructions executable by one or more processors. In at least one example, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one example, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one example, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one example, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one example, different components of a computer system have separate processors and different processors execute different subsets of instructions.

Accordingly, in at least one example, computer systems are configured to implement one or more services that singly or collectively perform operations of processes described herein and such computer systems are configured with applicable hardware and/or software that enable performance of operations. Further, a computer system that implements at least one example of present disclosure is a single device and, in another example, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate examples of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may or may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any appropriate device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one example, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one example, process of obtaining, acquiring, receiving, or inputting analog and digital data can be accomplished in a variety of ways such as by receiving data as a parameter of a function call or a call to an application programming interface. In at least one example, processes of obtaining, acquiring, receiving, or inputting analog or digital data can be accomplished by transferring data via a serial or parallel interface. In at least one example, processes of obtaining, acquiring, receiving, or inputting analog or digital data can be accomplished by transferring data via a computer network from providing entity to acquiring entity. In at least one example, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An apparatus comprising:
    a crossbar circuit that routes one or more packets between one or more ingress domains and one or more egress domains associated with the apparatus, wherein the crossbar circuit comprises a plurality of sub crossbar domains;
    one or more ingress control circuits associated with the one or more ingress domains, wherein the one or more ingress control circuits are to distribute packet data of the one or more packets to the plurality of sub crossbar domains;
    an egress control circuit associated with an egress domain of the one or more egress domains, wherein the egress control circuit is to receive data bits associated with the packet data from egresses associated with the plurality of sub crossbar domains; and
    one or more queueing circuits comprising a dispatcher circuit, wherein the dispatcher circuit is to:
        spread a set of transmission jobs among the plurality of sub crossbar domains based on a target order; and
        allocate buffer space in an egress reorder buffer associated with the egress domain.

2. The apparatus of claim 1, wherein the one or more ingress control circuits are to spread the packet data of the one or more packets among the plurality of sub crossbar domains based on at least one criterion.

3. The apparatus of claim 1, wherein the one or more ingress control circuits are to spread the packet data of the one or more packets among the plurality of sub crossbar domains based on:
    a random spreading of the packet data among the plurality of sub crossbar domains;
    a pseudo-random spreading of the packet data among the plurality of sub crossbar domains;
    a flow hash based spreading of the packet data among the plurality of sub crossbar domains;
    a bandwidth spreading of the packet data among the plurality of sub crossbar domains;
    a cyclic based spreading of the packet data among the plurality of sub crossbar domains;
    buffer occupancy associated with the plurality of sub crossbar domains; or
    a combination thereof.

4. The apparatus of claim 1, wherein the packet data of the one or more packets is spread among buffers associated with at least one sub crossbar domain of the plurality of sub crossbar domains based on:

one or more control signals from an ingress control circuit of the one or more ingress control circuits; or one or more second control signals from processing circuitry of the crossbar circuit.

5. The apparatus of claim 1, wherein the one or more ingress control circuits are to:

set respective buffer thresholds associated with a plurality of buffers allocated to the plurality of sub crossbar domains; and distribute the packet data among the plurality of buffers based on satisfying at least one buffer threshold of the respective buffer thresholds.

6. The apparatus of claim 1, wherein the egress control circuit is to:

reorder the data bits received from the egresses of the plurality of sub crossbar domains based on an ordering; or refrain from reordering the data bits, wherein the egress control circuit reorders the data bits or refrains from reordering the data bits based on an attribute associated with the distribution of the packet data of the one or more packets.

7. The apparatus of claim 1, wherein the set of transmission jobs are associated with routing the packet data of the one or more packets between a buffer domain of each sub crossbar domain and the one or more egress domains.

8. The apparatus of claim 7, wherein the target order is indicated by the one or more queueing circuits.

9. The apparatus of claim 1, wherein the one or more ingress control circuits are to provide one or more control signals associated with:

distributing first packet data of the one or more packets to a first sub crossbar domain of the plurality of sub crossbar domains; and distributing second packet data of the one or more packets to a second sub crossbar domain of the plurality of sub crossbar domains.

10. The apparatus of claim 1, wherein the crossbar circuit is to:

route first packet data of the one or more packets, via a first sub crossbar domain of the plurality of sub crossbar domains, to a multiplexer device associated with the egress domain of the one or more egress domains; and route second packet data of the one or more packets, via a second sub crossbar domain of the plurality of sub crossbar domains, to the multiplexer device.

11. The apparatus of claim 1, wherein the crossbar circuit comprises:

a multiplexer device to, based on one or more control signals from an ingress control circuit of the one or more ingress control circuits, provide the packet data of the one or more packets to a sub crossbar domain of the plurality of sub crossbar domains; and a second multiplexer device to distribute the packet data among buffers of the sub crossbar domain.

12. An apparatus comprising:

a crossbar circuit that routes one or more packets between one or more ingress domains and one or more egress domains associated with the apparatus, wherein the crossbar circuit comprises a plurality of sub crossbar domains; and processing circuitry to:

distribute, by one or more ingress control circuits associated with the one or more ingress domains, packet data of the one or more packets to the plurality of sub crossbar domains;

receive, by an egress control circuit associated with an egress domain of the one or more egress domains, data bits associated with the packet data from egresses associated with the plurality of sub crossbar domains; and reorder the data bits received from the egresses of the plurality of sub crossbar domains based on an ordering; or refrain from reordering the data bits, wherein the processing circuitry reorders the data bits or refrains from reordering the data bits based on an attribute associated with the distribution of the packet data of the one or more packets.

13. The apparatus of claim 12, wherein the processing circuitry is to further:

spread, by the one or more ingress control circuits, the packet data of the one or more packets among the plurality of sub crossbar domains based on at least one criterion.

14. The apparatus of claim 12, wherein the processing circuitry is to further:

spread, by the one or more ingress control circuits, the packet data of the one or more packets among the plurality of sub crossbar domains based on:

a random spreading of the packet data among the plurality of sub crossbar domains;

a pseudo-random spreading of the packet data among the plurality of sub crossbar domains;

a flow hash based spreading of the packet data among the plurality of sub crossbar domains;

a bandwidth spreading of the packet data among the plurality of sub crossbar domains;

a cyclic based spreading of the packet data among the plurality of sub crossbar domains;

buffer occupancy associated with each sub crossbar domain of the plurality of sub crossbar domains; or a combination thereof.

15. The apparatus of claim 12, wherein:

the packet data of the one or more packets is spread among buffers associated with at least one sub crossbar domain of the plurality of sub crossbar domains based on:

one or more control signals from an ingress control circuit of the one or more ingress control circuits; or one or more second control signals from the processing circuitry.

16. The apparatus of claim 12, wherein the processing circuitry is to further:

set, by the one or more ingress control circuits, respective buffer thresholds associated with a plurality of buffers allocated to the plurality of sub crossbar domains; and distribute, by the one or more ingress control circuits, the packet data among the plurality of buffers based on satisfying at least one buffer threshold of the respective buffer thresholds.

17. A switching device comprising:

a crossbar circuit comprising a plurality of sub crossbar domains; and one or more ingress control circuits that are to distribute packet data of one or more packets to the plurality of sub crossbar domains; and an egress control circuit that is to receive data bits associated with the packet data from egresses associated with the plurality of sub crossbar domains;

wherein the crossbar circuit comprises:

a first multiplexer device to provide the packet data of the one or more packets to a sub crossbar domain of the plurality of sub crossbar domains; and a second multiplexer device to distribute the packet data among buffers of the sub crossbar domain.

18. The switching device of claim 17, wherein the one or more ingress control circuits are to spread the packet data of the one or more packets among the plurality of sub crossbar domains based on at least one criterion.

19. The switching device of claim 17, wherein the first multiplexer device and the second multiplexer device are all-to-all multiplexer devices.

20. The switching device of claim 17, wherein the egress control circuit is to:

reorder the data bits received from the egresses associated with the plurality of sub crossbar domains based on an ordering; or refrain from reordering the data bits, wherein the egress control circuit reorders the data bits or refrains from reordering the data bits based on an attribute associated with the distribution of the packet data of the one or more packets.

\* \* \* \* \*